Figure 1:
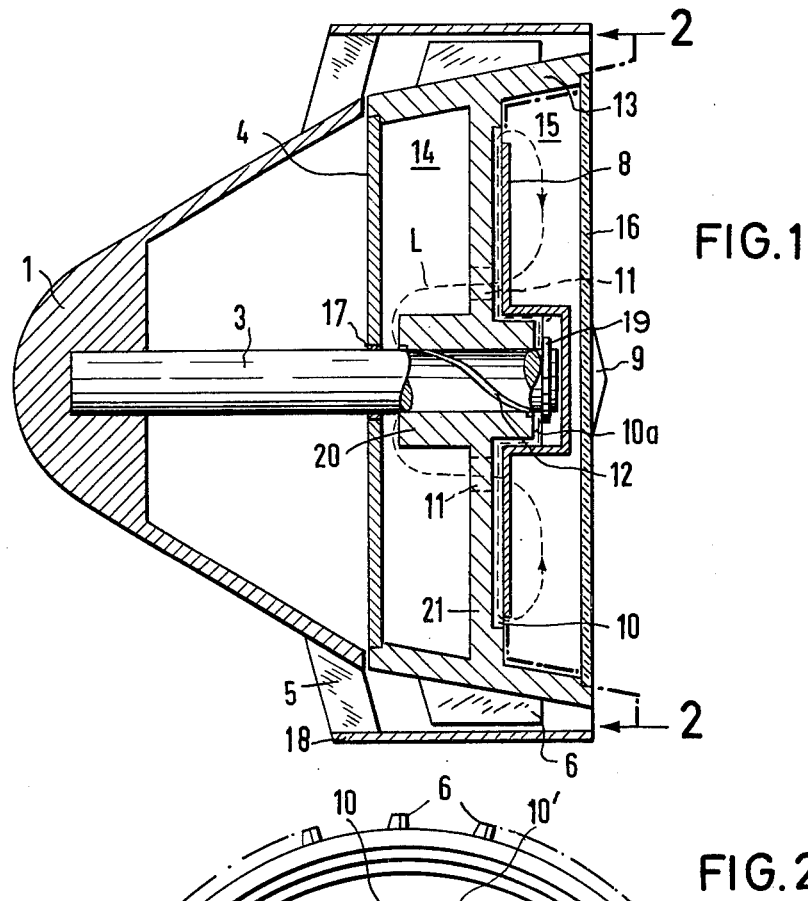

United States Patent [19]
Schuwerk

[11] 3,942,863
[45] Mar. 9, 1976

[54] ARRANGEMENT FOR A ROTATING AUTOMOBILE MIRROR

[76] Inventor: Fritz Schuwerk, Jutastrasse 26, 8 Munich 2, Germany

[22] Filed: July 12, 1974

[21] Appl. No.: 487,882

[30] Foreign Application Priority Data
Mar. 29, 1974 Germany............................ 2415407

[52] U.S. Cl................................. 350/62; 350/289
[51] Int. Cl.² ...................... G02B 5/08; B60R 1/06
[58] Field of Search .............................. 350/61–63, 350/99, 289

[56] References Cited
UNITED STATES PATENTS
| | | | |
|---|---|---|---|
| 1,304,548 | 5/1919 | Normanville | 350/62 |
| 3,021,757 | 2/1962 | Ellis | 350/62 |
| 3,712,703 | 1/1973 | Newdigate | 350/62 |

FOREIGN PATENTS OR APPLICATIONS
| | | | |
|---|---|---|---|
| 1,780,533 | 7/1970 | Germany | 350/62 |
| 548,295 | 4/1932 | Germany | 350/63 |

Primary Examiner—David H. Rubin

[57] ABSTRACT

An arrangement for a rotating vehicular mirror of the self-wiping type which is comprised of a circular mirror supported by means of a central shaft and driven by the vehicular slipstream by means of impellers distributed in the mirror circumference. The mirror construction includes an enclosed chamber mounted for rotation and at least part of one wall of the chamber being formed by the mirror element, the chamber defining a series of radially disposed closed passageways open at one end to the central region adjacent the axis of rotation and at the other end to a peripheral region adjacent the surface of rotation so that rotation of the chamber leads to circulation and recirculation of the enclosed air due to centrifugal force from the central region to the peripheral region and across the rear face of the mirror element.

6 Claims, 2 Drawing Figures

ARRANGEMENT FOR A ROTATING AUTOMOBILE MIRROR

The present invention concerns an arrangement for a rotating vehicular mirror of a self-wiping type for exterior mounting. The generally circular mirror is supported by means of a central shaft and driven by the vehicular slipstream by means of obliquely located impellers distributed in the mirror circumference.

A rotating automobile mirror which is intended for mounting on the exterior of an automobile is described in published German specification (DOS) No. 2,040,993.

The present invention provides an arrangement for a rotating automobile mirror which is particularly simple and trouble-free in construction. The arrangement is characterised by an air guide passageway in the adjacent region between the inner wall of the rotor shaft hub and the outer wall of the rotor shaft which serves as a bearing for the rotor and which extends along the entire length of the rotor hub and terminates at one hub end in at least one radial air passageway, the radial outer end of which opens so as to communicate with a first closed rotor chamber which is defined by the rotor center wall and the mirror whereby the first rotor chamber is connected through apertures formed in the rotor center wall with a second rotor chamber, which chamber is formed by the rotor center wall and a back rotor cover, and encompasses the rear hub end.

According to a preferred embodiment of the invention, the air guide passageway is a spiral groove which is formed in the rotor hub.

According to another advantageous embodiment, the radial air passageway is formed as a recess in the rotor center wall which is covered over essentially its entire radial length.

A particular advantage is obtained through the bearing arrangement in that the inventive construction leads to the formation of an air flow between the two rotor chambers which results in warming of the back wall of the mirror in view of the rapid flow of air which is warmed by bearing heat thus preventing condensation upon or coating of the mirror in cold weather.

Figure 2:
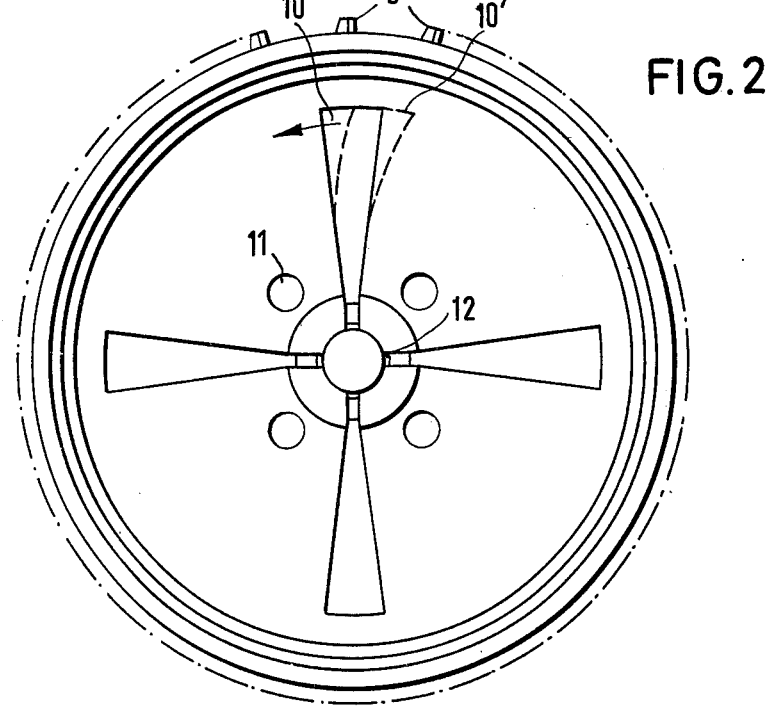

Referring to the accompanying drawings,

FIG. 1 is a sectional view through an automobile mirror which is provided with a rotor bearing arrangement according to the invention; and FIG. 2 is a section taken along line 2—2 in FIG 1.

The automobile mirror includes a housing 1 which serves as a support for the rotor shaft 3 which carries a rotor 13 at its end. The rotor 13 consists of a rotor center wall 21, a rotor backwall 4 and a mirror 16, with the mirror 16 together with the rotor wall 21 forming a first rotor chamber 15 and the backwall 4 and the rotor center wall 21 defining a second rotor chamber 14. Along the outer circumference of the rotor are arranged laterally extending impeller vanes 6 to which is conveyed the vehicular slipstream by way of air guide ring 18 thereby forming an air flow which will effect rotation of the rotor. The air guide ring 18 contains a plurality of stationary vanes 5.

In the rotor center wall 21 there are formed at least two recesses 10 which form a radial air passageway which is covered on its upper surface by a cover 8 which extends in a radial direction until just short of the radial outer end of the recesses. Further, there are provided in the rotor center wall axial openings 11 which facilitate passage of air from one rotor chamber to the other rotor chamber. In the bordering region between the inner wall of hub 20 and the outer wall of the rotor shaft 3 there is provided an air passageway 12 which in a suitable manner is located on the inner wall of the hub and which makes possible air movement from one axial end of the hub to the other axial end thereof.

Upon rotation of the rotor, the air which is located in the radial outer portions of the air passageway 10 has imparted thereto due to centrifugal force a radially outwardly directed acceleration so as to form an air flow which is directed from the radial outer ends of the air passageway 10 at the backwall of the mirror radially inwardly and which flows through the aperture 11 into the adjoining rotor chamber 14 and which subsequently enters into the air passageway 12 adjacent one hub end so as to then enter the radial air passageway 10a at the other hub end and from which the stream in the radial air passageway 10 again flows radially outwardly.

The rotor backwall 4 preferably consists of a metal, which cools by conduction the air heated by the bearing heat.

The bearing heated air on being passed along the rear surface of the mirror 16 heats the mirror to prevent coating. The rotor backwall 4 is sealed with respect to the rotor shaft by means of a seal 17. The rotor hub 20 further is secured by means of supports 19 on the shaft against movement in the direction toward the mirror.

In accordance with one embodiment of the mirror, the mirror is provided with a mirror pyramid 9, which suitably is three sided so that the total angle may be viewed as one likes.

It is quite apparent that the air stream L shown in the drawing which prevents coating of the mirror provides an extremely advantageous characteristic which also may be employed independently of the arrangement of an air heating bearing.

By means of the air circulation there is further obtained a braking effect, which prevents reversal of the mirror at high rotational speeds.

In connection with the radial air passageways, a construction in which the cross-sectional area of the passageways increases radially by means of which the suction or aspirating effect is increased, has proven to be particularly suitable.

Especially useful from the standpoint of the achieved air circulation is a curved configuration of the radial air passageways 10, which are shown in FIG. 2 in chain-dotted illustration. The arrow shown in FIG. 2 signifies the direction of rotation of the rotor.

It is apparent that the vehicular mirror of this invention may be utilized in connection with any vehicle under any climatic conditions, but it has special utility in colder or more humid conditions where condensation or ice buildup is a hazard to visibility with exteriorly mounted mirrors. Although the invention has been particularly described with reference to the embodiment of the drawing for ease of illustration it will be understood that the principles involved have applicability to a wide variety of constructions and that variations apparent to the artisan are intended to be encompassed.

What is claimed is:

1. A vehicle rear view mirror construction comprising an outwardly reflecting mirror supported in an enclosed generally cylindrical rotor journalled for rotation through a hub upon a central shaft, said shaft being supported in a housing for said rotor, said housing forming at its periphery one or more scoops adapted to receive and direct air from the slipstream adjacent a vehicle in motion, said rotor having a side wall surmounted by a plurality of vane members located in proximity to said air scoops, said vane members providing rotational motion to said rotor under the influence of the vehicular slipstream, said rotor being generally subdivided along the axis of revolution into first and second chambers by a central radially disposed wall integral with said hub, said first chamber being bounded by said central wall, said mirror and said rotor side wall, and said second chamber being bounded by said central wall, said rotor side wall, and the rotor rear wall, said first and second chambers being in communication in the region adjacent the axis of rotation through perforations in the center wall, said hub and said central shaft having defined therebetween a groove forming a passageway between said first and second chambers, said passageway terminating in said first chamber in at least one radial air channel, the radial outer end thereof being open and communicating with said first rotor chamber at the periphery thereof, whereby upon rotation of the rotor the enclosed air entering said groove from said second rotor chamber is heated by passage along said hub and said central shaft, the heated air passes along said radial air channels, exits into said first rotor chamber adjacent the periphery of said rotor, passes across the rear face of said mirror, exits said first rotor chamber through said perforations and is recirculated by entry into said groove from said second rotor chamber.

2. The mirror construction of claim 1, wherein said groove is formed as a recess in said hub.

3. The mirror construction of claim 1, wherein said groove is formed in a spiral configuration.

4. The mirror construction of claim 1, wherein the cross-sectional area of said channels increases radially of said axis of rotation.

5. The mirror construction of claim 1, wherein said channels are recessed into the face of said center wall in said first rotor chamber, and are closed along the length thereof by a cooperating cover plate.

6. A circular rotatable vehicle mirror construction comprising a hub mounted on a central shaft secured to the mirror housing, the mirror being rotated by means of inclined blades distributed about the mirror periphery as a result of the air flow passing between the blades, characterized in that means for heating the mirror to prevent condensation upon or coating of the mirror in cool weather is provided by at least one groove (12) located in the interface between the internal wall of the hub (20) of the rotor (13) supporting the mirror (16) and the external wall of the rotor shaft (3), said groove (12) extending over the length of the hub (20) and terminating at one end of the hub in at least one radial air channel (10, 10'), the radially outer end thereof being open and communicating with a closed first rotor chamber (15) bounded by the central wall (21) of the rotor and the mirror (16), said first rotor chamber communicating through openings (11) in the central wall (21) of the rotor with a second rotor chamber (14) which is formed by the central wall of the rotor and a rearward rotor cover (4) and which contains the hub end remote from the radial air channel (10).

* * * * *